United States Patent
Zhang et al.

(10) Patent No.: US 8,078,403 B2
(45) Date of Patent: Dec. 13, 2011

(54) DETERMINING PERMEABILITY USING FORMATION TESTING DATA

(75) Inventors: Lei Zhang, Beijing (CN); XuanLi Hao, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 492 days.

(21) Appl. No.: 11/944,203

(22) Filed: Nov. 21, 2007

(65) Prior Publication Data

US 2009/0126475 A1    May 21, 2009

(51) Int. Cl.
*G01V 1/16* (2006.01)
*G01V 1/143* (2006.01)
*G01V 1/145* (2006.01)
*G01F 23/14* (2006.01)

(52) U.S. Cl. .............. 702/11; 702/5; 702/7; 702/47
(58) Field of Classification Search ............ 702/3, 4, 702/6, 7, 12, 179, 182, 183, 186; 73/152.05; 175/45; 324/303
See application file for complete search history.

(56) References Cited

U.S. PATENT DOCUMENTS

| | | | | |
|---|---|---|---|---|
| 5,220,504 A | * | 6/1993 | Holzhausen et al. | 702/12 |
| 6,131,655 A | * | 10/2000 | Shaw | 166/105.5 |
| 6,856,132 B2 | * | 2/2005 | Appel et al. | 324/303 |
| 6,991,045 B2 | * | 1/2006 | Vinegar et al. | 175/45 |
| 7,059,179 B2 | * | 6/2006 | Proett et al. | 73/152.05 |
| 7,221,158 B1 | * | 5/2007 | Ramakrishnan | 324/303 |

OTHER PUBLICATIONS

Peter A. Goode, R.K. Michael Thambynayagam, Permeability Determination with a Multiprobe Formation Tester, SPE 20737, Dec 1992, p. 297-303, p. 218-224.
P.R. Jackson, R. Banerjee, R.K.M. Thambynayagam, An Integrated Approach to Interval Pressure Transient Test Analysis Using Analytical and Numerical Methods, SPE 81515, Apr. 2003, p. 1-9.
Xian, C., Carnegie, C., Al Raisi, M.R., Petricola, M., Chen, J., An Integrated Efficient Approach to Perform IPTT Interpretation, SPE 88561, Oct. 2004, p. 1-17.

(Continued)

*Primary Examiner* — Mohamed Charioui
*Assistant Examiner* — Felix Suarez
(74) *Attorney, Agent, or Firm* — Daryl R. Wright; Hoffman Warnick LLC (57) ABSTRACT

A method, system and computer program product for determining permeability of an earth formation of a reservoir are disclosed. A method may include: providing formation testing data of the earth formation; defining layering of the earth formation; determining a geological model for each layer; modeling pressure transient in the earth formation by representing pressure transient within a layer using an analytical solution and representing pressure transient between two layers using a numerical solution, the analytical solution selected based on at least one of the respective geological model and data regarding a drilled well of the reservoir, and a parameter of the analytical solution and a parameter of the numerical solution being determined based on the formation testing data; and determining the permeability of the earth formation based on the pressure transient model.

15 Claims, 5 Drawing Sheets

OTHER PUBLICATIONS

M. Onur, P.S. Hegeman, F.J. Kuchuk, Pressure-Transient Analysis of Dual Packer-Probe Wireline Formation Testers in Slanted Wells, SPE 90250, Sep 2004, p. 1-16.

Fikri J. Kuchuk, Pressure Behavior of the MDT Packer Module and DST in Crossflow-Multilayer Reservoirs, Journal of Petroleum Science and Engineering 11 (1994), p. 123-135.

Cosan Ayan, Hafez Hafez, Sharon Hurst, Fikri Kuchuk, Aubrey O'Callaghan, John Peffer, Julian Pop, Murat Zeybek, Characterizing Permeability with Formation Testers, Oilfield Review, Autumn 2001, vol. 13, No. 3, p. 2-23.

International Patent Application No. PCT/IB2008003887, International Preliminary Report on Patentability dated Jun. 10, 2010.

Gok et al., "Estimating Formation Properties in Heterogenous Reservoirs Using 3D Interval Pressure Transient Test and Geostatistical Data", Society of Petroleum Engineers, Mar. 2005, XP002543795.

Kuchuk et al., "Estimating permeability distribution from 3D interval pressure transient tests", Journal of Petroleum Science and Engineering, 2003, XP002543794.

International Patent Application No. PCT/IB2008003887, International Search Report and Written Opinion dated Sep. 15, 2009.

\* cited by examiner

DETERMINING PERMEABILITY USING FORMATION TESTING DATA

FIELD OF THE INVENTION

The disclosure relates in general to reservoir development, and more particularly to determining a permeability of an earth formation using formation testing data.

BACKGROUND OF THE INVENTION

Permeability (commonly symbolized as k) is a measure of the ability of a material to transmit fluids, which is of great importance in determining the dynamic flow characteristics of hydrocarbons in oil and gas reservoirs. Typically, permeability of an earth formation may be characterized as horizontal permeability ($k_h$) and vertical permeability ($k_v$), which measure the permeability in the horizontal and vertical planes, respectively. Earth formations are complex and heterogeneous such that permeability is not distributed uniformly. Interval Pressure Transient Test (IPTT) with a modular dynamic tester have proved to be an efficient means for characterizing permeability distribution near a wellbore of a reservoir, and IPTT is widely accepted as a preferred approach for layered earth formation systems.

An IPTT requires a dual-probe or a dual-packer module and at least one vertical observation probe positioned below or above either the dual-probe or the dual-packer module to obtain the formation testing data. Typically, multiple sets of probes and packers (modules) are involved in the testing, and each set of probe(s) and packer(s) is referred to as a "test station".

Two approaches are used to interpret IPTT data: analytical method and numerical method. For example, Goode and Thambynayagam (*Analytic Models for a Multiple Probe Formation Tester*," SPE 20737 presented at the Annual Technical Conference and Exhibition of the SPE, New Orleans, 1990), Kuchuk (*Pressure Behavior of the MDT Packer Module and DST in Crossflow-Multilayer Reservoirs*, JOURNAL OF PETROLEUM SCIENCE AND ENGINEERING (1994) 11, 123), and Onur et al. (*Pressure-Transient Analysis of Dual Packer-Probe Wireline Formation Testers in Slanted Wells*, SPE 90250 presented at the SPE Annual Technical Conference and Exhibition, Houston, September 2004) disclosed analytical methods for IPTT interpretation. Jackson et al. (*An Integrated Approach to Interval Pressure Transient Test Analysis Using Analytical and Numerical Methods*, SPE 81515 presented at the SPE 13th Middle East Oil Show & Conference, Bahrain, Apr. 2003) and Xian et al. (*An Integrated Efficient Approach To Perform IPTT Interpretation*, SPE 88561 presented at the SPE Asia Pacific Oil and Gas Conference and Exhibition, Perth, Australia, October, 2004) disclose numerical simulations for IPTT interpretation.

Conventional analytical solution for multi-layer model in IPTT interpretation is based on the assumption that each layer is homogeneous and the drilled well is a vertical well. But in the real world, a layer may be characterized with different geological models, e.g., homogeneous or heterogeneous. And the drilled well can be vertical well or deviated well. In addition, conventional analytical solution for IPTT interpretation of a deviated well is based on the assumption that the model is one layer homogeneous model. Since the deduction of an analytical solution is very complicated, it is very difficult to extend this approach to situations of multi-layer deviated well or multi-layer dual-porosity well (vertical or deviated). On the other hand, the application of numerical simulation methods is more flexible and is able to handle the situations of multi-layer deviated well or multi-layer dual-porosity well (vertical or deviated). But the application of a numerical solution is very time consuming.

SUMMARY OF THE INVENTION

A first aspect of the invention is directed to a method for determining permeability of an earth formation of a reservoir, the method comprising: providing formation testing data of the earth formation; defining layering of the earth formation; determining a geological model for each layer; modeling pressure transient in the earth formation by representing pressure transient within a layer using an analytical solution and representing pressure transient between two layers using a numerical solution, the analytical solution selected based on at least one of the respective geological model and data regarding a drilled well of the reservoir, and a parameter of the analytical solution and a parameter of the numerical solution being determined based on the formation testing data; and determining the permeability of the earth formation based on the pressure transient model.

A second aspect of the invention is directed to a system for determining permeability of an earth formation of a reservoir, the system comprising: means for receiving formation testing data of the earth formation; means for defining layering of the earth formation; means for determining a geological model for each layer; means for modeling pressure transient in the earth formation by representing pressure transient within a layer using an analytical solution and representing pressure transient between two layers using a numerical solution, the analytical solution selected based on at least one of the respective geological model and data regarding a drilled well of the reservoir, and a parameter of the analytical solution and a parameter of the numerical solution being determined based on the formation testing data; and means for determining the permeability of the earth formation based on the pressure transient model.

A third aspect of the invention is directed to a computer program product for determining permeability of an earth formation of a reservoir, comprising: computer usable program code which, when executed by a computer system, enables the computer system to: receive formation testing data of the earth formation; define layering of the earth formation; determine a geological model for each layer; model pressure transient in the earth formation by representing pressure transient within a layer using an analytical solution and representing pressure transient between two layers using a numerical solution, the analytical solution selected based on at least one of the respective geological model and data regarding a drilled well of the reservoir, and a parameter of the analytical solution and a parameter of the numerical solution being determined based on the formation testing data; and determine the permeability of the earth formation based on the pressure transient model.

A fourth aspect of the invention is directed to a method of generating a system for determining permeability of an earth formation of a reservoir, the method comprising: at least one of creating, maintaining, deploying and supporting a computer infrastructure operable to: receive formation testing data of the earth formation; define layering of the earth formation; determine a geological model for each layer; model pressure transient in the earth formation by representing pressure transient within a layer using an analytical solution and representing pressure transient between two layers using a numerical solution, the analytical solution selected based on at least one of the respective geological model and data regarding a drilled well of the reservoir, and a parameter of the analytical solution and a parameter of the numerical solution being determined based on the formation testing data; and determine the permeability of the earth formation based on the pressure transient model.

Other aspects and features of the present invention, as solely defined by the claims, and additional advantages of the invention will become apparent to those skilled in the art upon reference to the following non-limited detailed description taken in conjunction with the provided figures.

BRIEF DESCRIPTION OF THE DRAWINGS

The disclosure is illustrated by way of example and not intended to be limited by the figures of the accompanying drawings in which like references indicate similar elements and in which.

It is noted that the drawings are not to scale.

DETAILED DESCRIPTION OF THE DISCLOSURE

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

1. SYSTEM OVERVIEW

Figure 1:
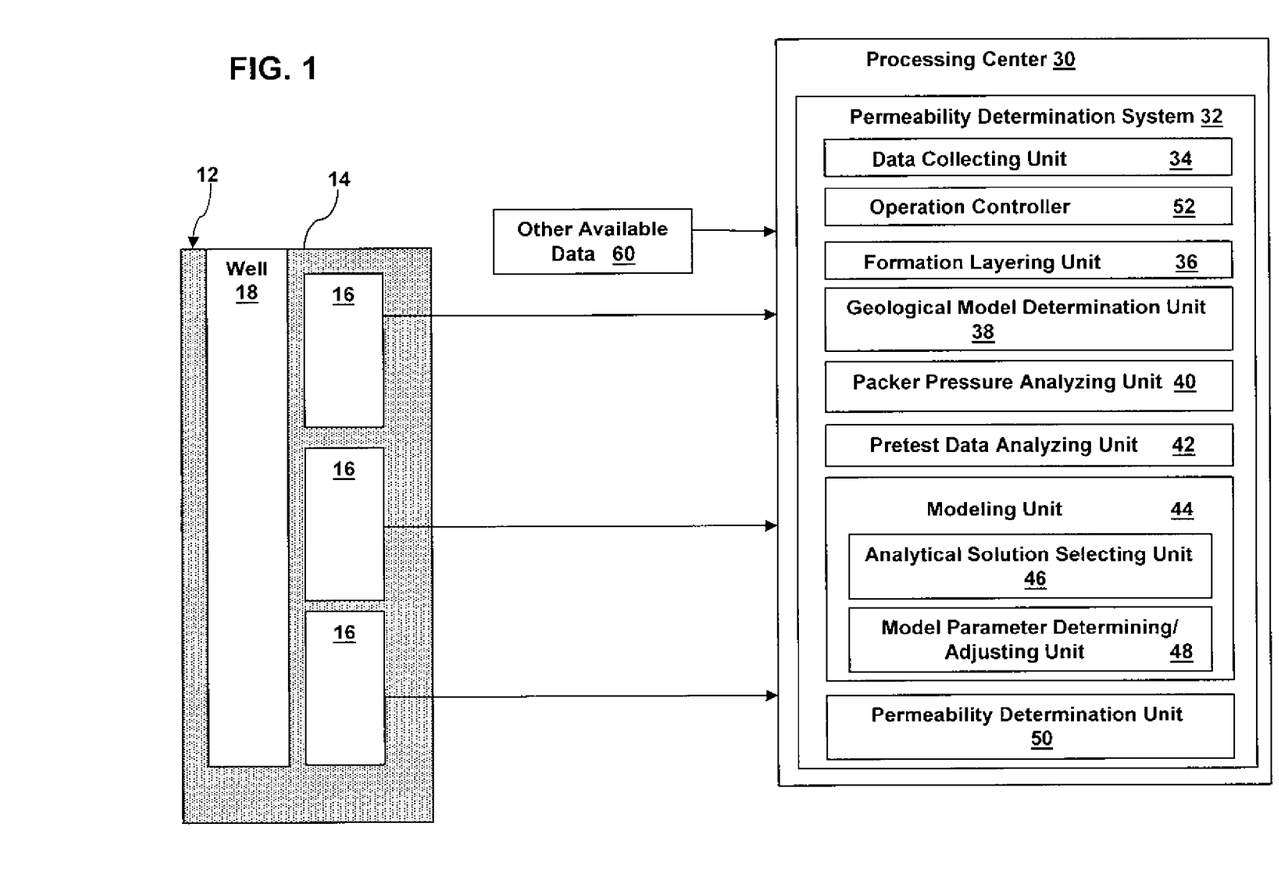
FIG. 1 shows schematically a system.
Figure 2:
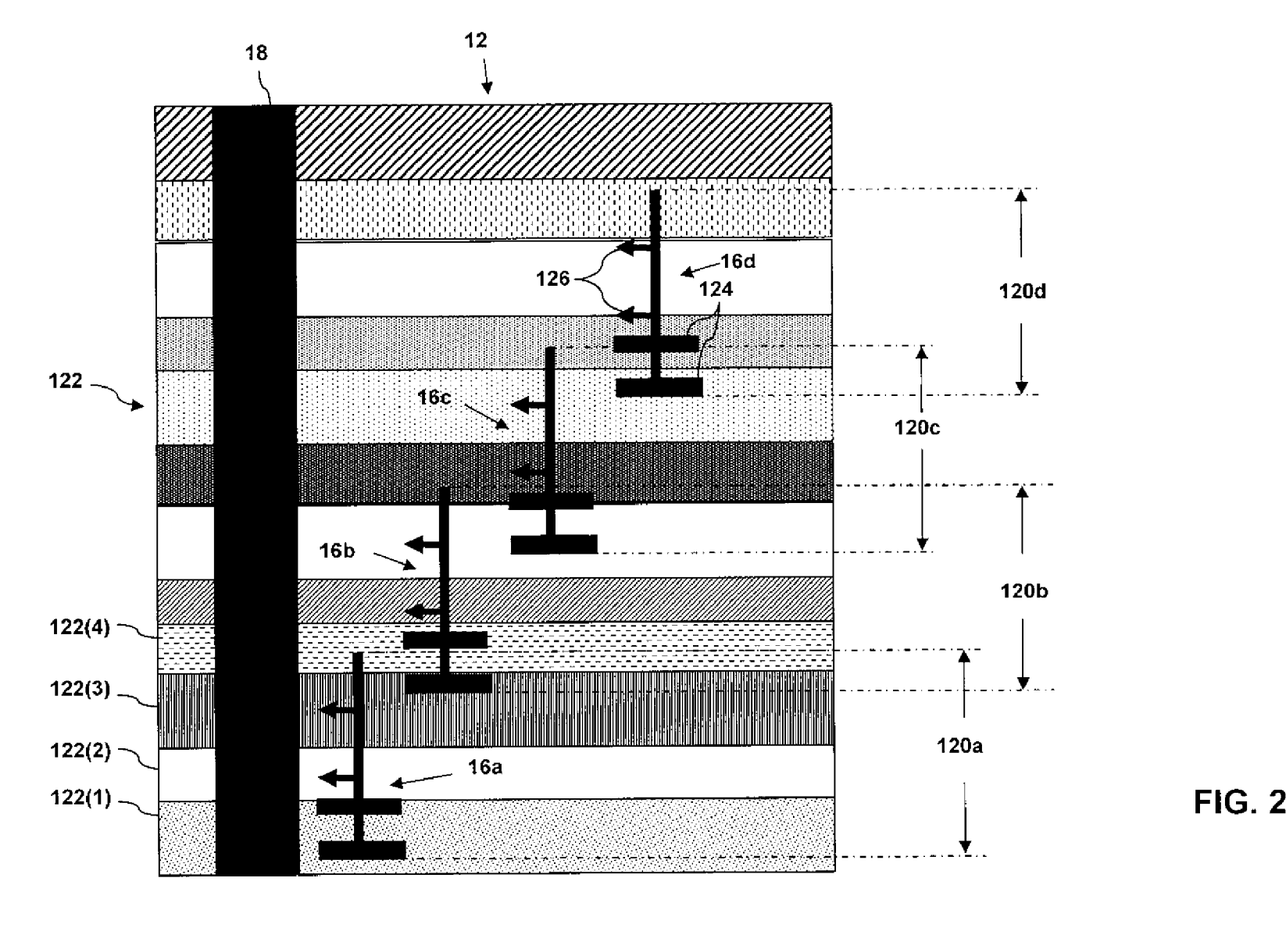
FIG. 2 shows a schematic diagram layering and measurement regions.

Referring to FIG. 1, a schematic diagram of an illustrative system 10 for determining permeability of an earth formation of a reservoir 12 is shown. System 10 includes at least one (preferably multiple) measurement stations 16 positioned along with a well 18 drilled in reservoir 12. In FIG. 1, well 18 is shown as a vertical well, but may also be other type of wells, such as a deviated well including a horizontal well. Reservoir 12 may include any reservoir including but not limited to oil reservoir, gas reservoir, coal reservoir, and underground water reservoir. As appreciated, each measurement station 16 may include a dual-packer module (or a dual-probe module) and at least one observation probe positioned separately along the drilled well, with the probe 126 positioned separately from the packer 124 (FIG. 2) by a distance of, e.g., 6.6 feet. Each measurement station 16 effectively measures a measurement region 120 (FIG. 2) extending along with drilled well 18 about but larger than the distance between the respective packer and probe. FIG. 2 schematically shows the relative positions of the measurement regions 120 of multiple measurement stations 16.

As shown in FIG. 2, four measurement stations 16a, 16b, 16c, 16d (each may be generally referred as a measurement station 16) are set for four measurement regions 120a, 120b, 120c, 120d (each may be generally referred as a measurement region 120) along with drilled well 18. Each measurement region 120 covers multiple layers 122 of earth formation 14 of reservoir 12, and two immediately adjacent measurement regions may include one or more overlapping layers. That is, two immediately adjacent measurement regions 120 are overlapped. For example, measurement regions 120a, 120b both cover layers 122(3), 122(4). FIG. 2 shows that each measurement station 16 includes two packers 124, and two probes 126 for descriptive purposes. Other configurations/modules of measurement station 16 are also possible and included in the disclosure.

Referring back to FIG. 1, measurement stations 16 communicate to a processing center 30 including a permeability determination system 32. Permeability determination system 32 includes a data collecting unit 34; a formation layering unit 36; a geological model determination unit 38; a packer pressure analyzing unit 40; a pretest data analyzing unit 42; a modeling unit 44 including an analytical solution selecting unit 46 and a model parameter determining/adjusting unit 48; and a permeability determination unit 50. Permeability determination system 32 also includes an operation controller 52.

According to an embodiment, processing center 30 may be implemented by a computer system. The computer system can comprise any general purpose computing article of manufacture capable of executing computer program code installed thereon to perform the process described herein. The computer system can also comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Additional to the data communicated from measurement stations 16, processing center 30 may also collect other available data 60 such as openhole log data, probe pretest data, production/production history data, etc.

Processing center 30, specifically permeability determination system 32, may output the determined permeability/permeability distribution of earth formation 14 around drilled well 18, which is important in the characterization of the reservoir dynamics. In the description herein, the term "permeability" of an earth formation includes the situation of a permeability distribution as the permeability of earth formation 14 may not be uniform. The operation of permeability determination system 32 will be described in detail herein.

2. OPERATION METHODOLOGY

Figure 3:
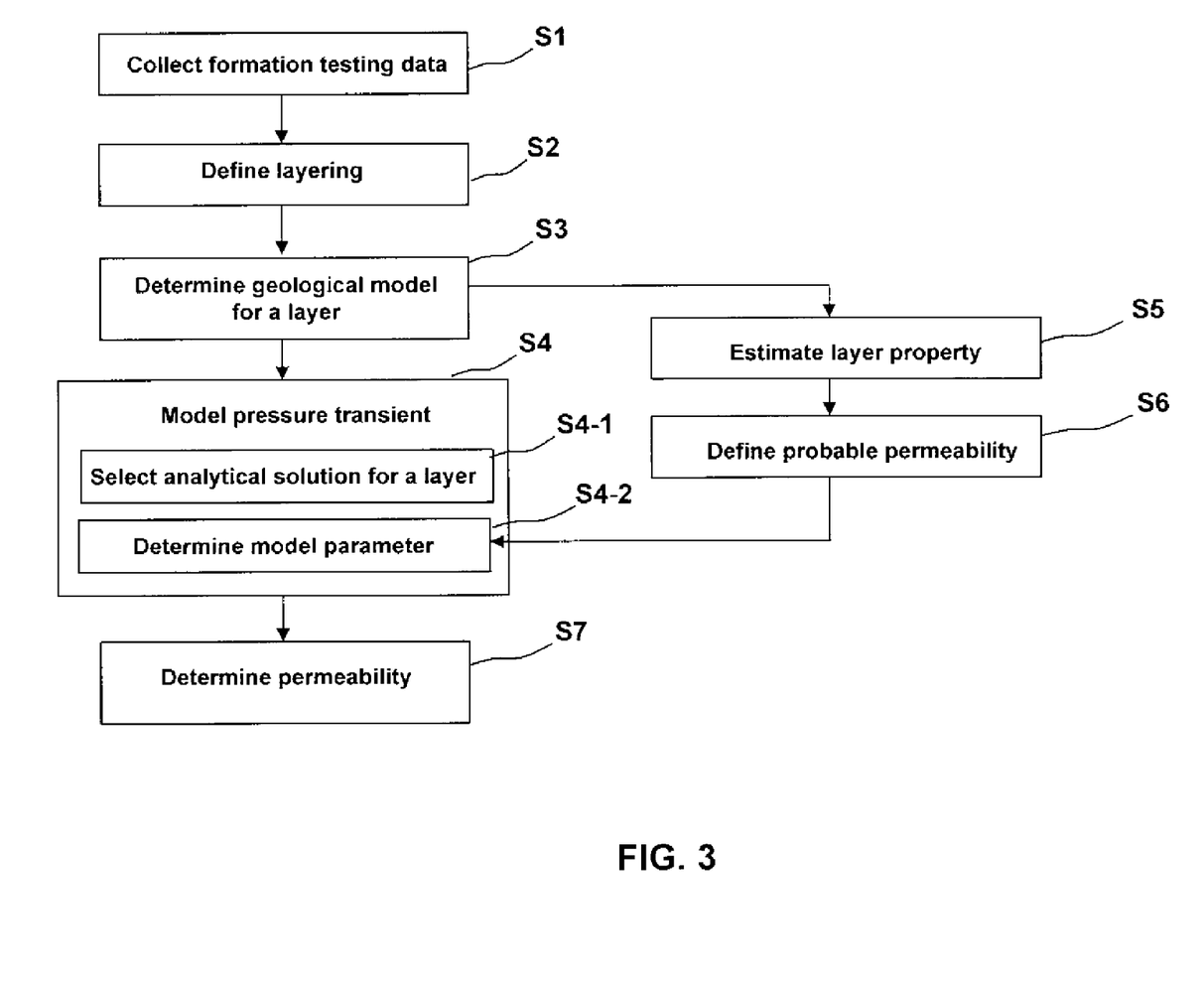
FIG. 3 shows a flow diagram of the operation of a permeability determining system.

FIG. 3 shows embodiments of the operation of permeability determination system 32. In process S1, data collecting unit 34 collects formation testing (also referred to as flow testing) data, e.g., IPTT data, from measurement stations 16 and other available data 60. It should be appreciated that although FIG. 1 shows that measurement stations 16 directly communicate to processing center 30, this is not necessary. Processing center 30 may collect formation testing data from other sources. That is, processing center 30 may operate independent of any specific formation testing (e.g., IPTT) system and may process the formation testing data obtained by any formation testing (e.g., IPTT) system.

In process S2, formation layering unit 36 defines the layering of earth formation 14 of reservoir 12. Any now known or later developed method may be used in defining earth formation 14 layering. For example, formation layering unit 36 may define the layering based on openhole log data, e.g., from high-resolution images. The defined layering may be adjusted if, for example, further analysis based on an initially defined layering illustrates that the initial layering is inaccurate. In addition, layering of formation 14 may already be defined separately to the operation of permeability determination system 32. For example, the openlog data may already be analyzed to determine earth formation 14 layering in designing the IPTT test, for example, the setup of measurement stations 16. The separately determined layering may be provided to formation layering unit 36, and formation layering unit 36 may decide whether to accept the provided layering or adjust it for the purpose of the current operation.

In process S3, geological model determination unit 38 determines a geological model for each layer defined in process S2. The geological model may be determined using any method and all are included. For example, geological model determination unit 38 may determine the geological model of a layer based on the openhole log data. Among other things, there are two types of criteria for the determination and/or description of geological models in the current operation: Heterogeneity and Isotropism. A formation with rock properties that do not change with locations in the reservoir is referred to as a "Homogeneous Formation". An absolute (ideal) homogeneous formation does not exist in the real world. However, many formations are sufficiently close to this situation that they can be practically considered homogeneous. A formation with rock properties that change with locations in the reservoir is referred to as a "Heterogeneous Formation". Some naturally fractured reservoirs (also referred to as "dual-porosity reservoirs") include heterogeneous formations. A formation whose rock properties are the same in all directions is referred to as an "Isotropic Formation". Although an absolute isotropic formation does not exist in the real world, a formation with fluid flows in rocks that approximate this situation may be practically considered as isotropic. A formation with directionally dependent rock properties is referred to as an "Anisotropic Formation". The most common directionally dependent properties are permeability and stress. Most formations have vertical to horizontal permeability anisotropy with vertical permeability being much less than horizontal permeability. Bedding plane permeability anisotropy is common in the presence of natural fractures. The greatest stress anisotropy is typically between overburden stress and horizontal stress in the bedding plane. Bedding plane stress contrasts are common in tectonically active regions. Permeability anisotropy may be related to stress anisotropy.

According to an embodiment, the geological model of a layer includes a combination of one of an isotropic formation or an anisotropic formation and one of a homogeneous formation or a Heterogeneous formation. That is, the geological model may be Homogeneous and Isotropic, Homogeneous and Anisotropic, Heterogeneous and Isotropic, or Heterogeneous and Anisotropic.

Figure 4:
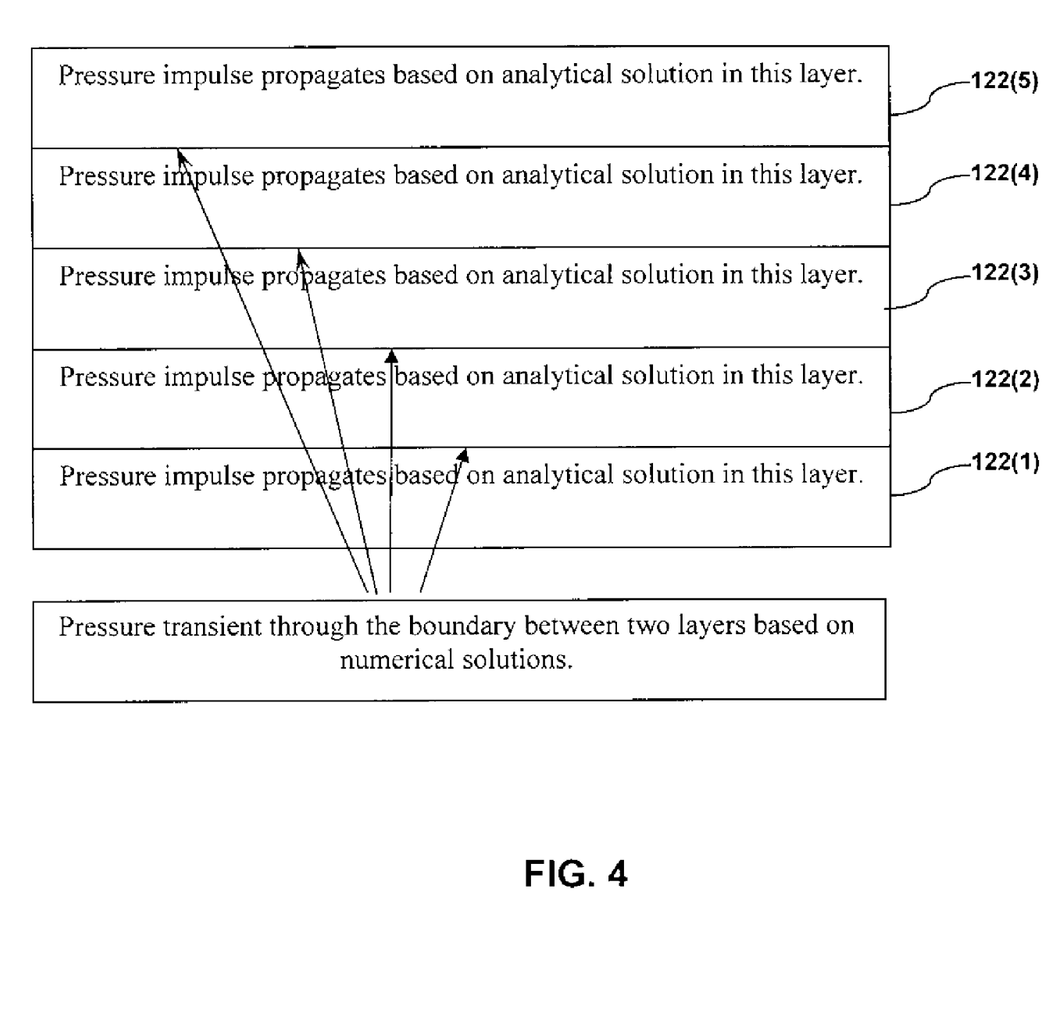
FIG. 4 shows a schematic diagram of a pressure transient model.

In process S4, modeling unit 44 models pressure transient in earth formation 14 of reservoir 12. Specifically, modeling unit 44 represents the pressure transient (i.e., propagating of pressure impulse) within a layer 122 using an analytical solution and represents a pressure transient between two layers using a numerical simulation method (referred to herein as a numerical solution). FIG. 4 shows a schematic structure of the pressure transient model. Process S4 includes multiple sub-processes. In sub-process S4-1, analytical solution selecting unit 46 selects an analytical solution for each layer 122 based on at least one of the respective geological model and information regarding drilled well 18 of reservoir 12. For example, the type of drilled well 18, e.g., vertical or deviated, may be used in determining the analytical solution for a layer 122 where a dual-packer module 124 (or a dual-probe module) is located as shown in FIG. 2. It should be appreciated that analytical solution selecting unit 46 may select any now known or later developed analytical solution that fits the geological model and/or the type of drilled well of a layer 122.

In sub-process S4-2, model parameter determining/adjusting unit 48 determines parameters of the analytical solutions of layers 122 and the numerical solutions between layers 122. The formation testing data communicated from measurement stations 16 may be used in the regression analysis in determining the parameters of an analytical solution and may be used in the simulation analysis for a numerical solution. For example, the formation testing data may include reservoir pressure in a layer 122 where the dual-packer module 124 or observation probe 126 is located, or the value of skin in a layer 122 where packer 124 is located, or the value of wellbore storage in a layer 122 where dual-packer module 124 is located. The parameter determination may also be based on other available data 60, e.g., openhole log data. For example, the value of porosity in a layer 122 where dual-packer module 124 or observation probe 126 is located.

Processes S5 and S6 are optional. In process S5, packer pressure analyzing unit 40 interprets all the packer pressure data to estimate properties, for example, formation permeability, of a layer where the dual-packer module 124 is positioned. In process S6, pretest data analyzing unit 42 defines a probable permeability value of earth formation 14 of reservoir 12 based on pretest data, if pretest data is available. The results of processes S5 and S6, i.e., the estimated properties of layers and the defined probable permeability will be input to S4-2 to determine the parameters of the pressure transient model.

In process S7, permeability determination unit 50 determines permeability of earth formation 14 of reservoir 12 based on the established pressure transient model. Specifically, permeability determination unit 50 determines a vertical permeability and a horizontal permeability for each layer and thus obtains a permeability distribution of earth formation 14 of reservoir 12. Because the permeability determination based on a given pressure transient model (obtained in process S4) and formation testing data is known in the field, no further explanation will be provided.

Figure 5:
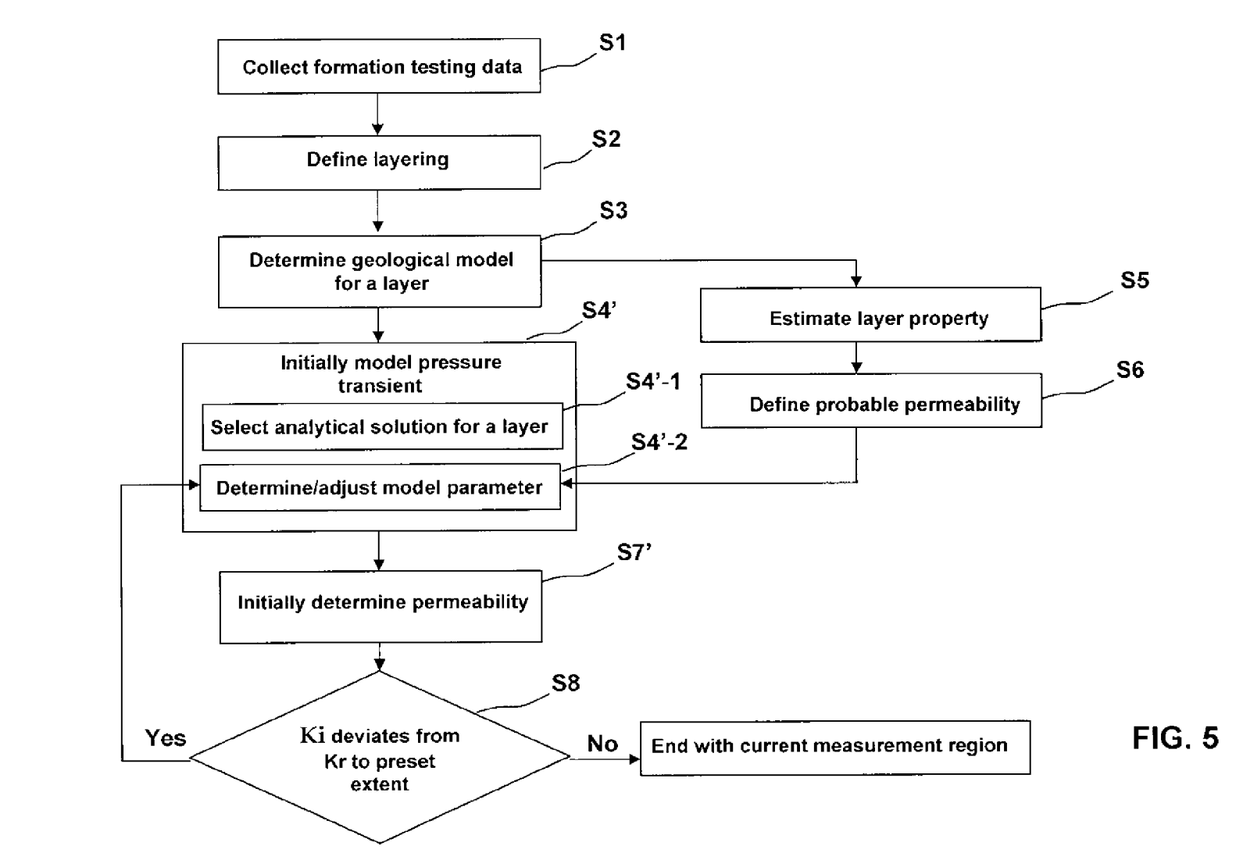
FIG. 5 shows a flow diagram of an operation of a permeability determining system with respect to a measurement region.

According to an embodiment, as shown in the flow diagram of FIG. 5, processes S4 and S5 of FIG. 3 may be implemented on each measurement region 120 separately and the results of the separate operations may be cross-checked. In FIG. 5, processes S1-S3 are similar to processes S8-S3 in FIG. 3, and these processes are implemented on each measurement region 120. As such, no further explanation will be provided for brevity. However, it need to be noted that although processes S1-3 are implemented on each measurement region 120, information/data obtained from all measurement stations 16 should be shared in the processes. For example, the geological model of an overlapping layer, e.g., layer 122(4), may be shared by the two respective overlapping measurement regions 120, e.g., 120a and 120b (FIG. 2). Further, as the processes are implemented on each and all measurement regions 120 similarly, the implementation on one measurement region 120, e.g., measurement region 120a, is described herein for brevity.

In process S4', modeling unit 44 initially models the pressure transient in measurement region 120a as in process S4 of FIG. 3.

In process S7', permeability determination unit 50 uses the initial pressure transient model to determine an initial permeability of earth formation 14 within the layers 122 of measurement region 120a including overlapping layers 122(3) and 122(4) covered by measurement region 120a and measurement region 120b. The initial permeability determination may be implemented similarly as in process S7 of FIG. 3.

In process S8, operation controller 52 may compare the determined initial permeability (Ki) of an overlapping layer 122(3) or 122(4) to another permeability (referred to as a reference permeability (Kr)) of the overlapping layer 122(3) or 122(4) determined in the operation of processes S4' and S7' with respect to measurement region 120b to check whether the two initial permeability values conform. As described above, processes S4' and S7' may be implemented with each measurement region 120. As such, for an overlapping layer 122, two permeability values may be obtained from the implementation of S4' and S7' on each respective covering measurement region 120. The two permeability values need to conform to one another to a preset extent, i.e., under preset criteria. Otherwise the model adjustment needs to be performed again for either measurement region 120a or measurement region 120b.

If the initial permeability (Ki) deviates from the reference permeability (Kr) to a preset extent, operation controller 52 may control the operation with measurement region 120a proceed to process S4', specifically, S4'-2, where model parameter determining/adjusting unit 48 adjusts the parameters of the pressure transient model. Possible adjustment may be made to the reservoir pressure in the layers where the dual-packer module 124 and/or observation probe 126 is located, the value of skin in the layer where the dual packer module 124 is located, and/or the value of wellbore storage in the layer 122 where the dual-packer module 124 is located, and/or the value of porosity in the layer 122 where the dual-packer module 124 or observation probe 126 is located. According to an embodiment, in the model adjustment, the permeability of the overlapping layer 122(3) or 122(4) determined from the operation with respect to measurement region 120b may be used as a basis for the adjustment regarding measurement region 120a such that the permeability determined in measurement region 120a will conform that in measurement region 120b with respect to the overlapping layers 122(3) and 122(4). The reason is that, in measurement region 120(a), the dual-packer module 124 is located in layer 122(1), i.e., distally from layer 122(3) and 122(4), while in measurement region 120(b), the dual-packer module 124 is location in layer 122(3) and 122(4), therefore the determined permeability in layer 122(3) and 122(4) from measurement region 120b is more accurate than the determined permeability in layer 122(3) and 122(4) from measurement region 120a.

As a consequence, according to an embodiment, the adjustments of the model parameter of measurement regions 120 are performed in a sequence in the direction of toolstring movement. That is, pressure transient model of a measurement region 120 (e.g., 120b) may be adjusted with respect to a next measurement region 120 (e.g., 120c) in the direction of toolstring movement because the dual-packer module 124 of the next measurement region is positioned closer to the overlapping layers 120.

If the initial permeability of overlapping layers conforms to the reference permeability, the initial permeability values of the whole measurement region 120 may be treated as accurate, and the pressure transient model may be treated as a correct. The operation with the current measurement region 120 ends.

3. CONCLUSION

While shown and described herein as a method and system for determining permeability of an earth formation of a reservoir, it is understood that the invention further provides various additional features. For example, in an embodiment, the invention provides a program product stored on a computer-readable medium, which when executed, enables a computer infrastructure to determine permeability of an earth formation of a reservoir. To this extent, the computer-readable medium includes program code, such as permeability determination system 32 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or other storage system, and/or as a data signal traveling over a network (e.g., during a wired/wireless electronic distribution of the program product).

In addition, a method of providing a system for determining permeability of an earth formation of a reservoir can be included. In this case, a computer infrastructure, such as process center 30 (FIG. 1), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as processing center 30 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s) It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to exemplary embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention has other applications in other environments.

We claim:

1. A method for determining permeability of an earth formation of a reservoir, the method comprising:
   providing formation testing data measured at multiple measurement stations along the drilled well, a measurement region of each measurement station covering multiple horizontal layers and measurement regions of two immediately adjacent measurement stations overlapping at least one horizontal layer using a computer, said multiple measurement stations including a dual-packer module or a dual-probe module and at least one observation probe positioned separately along with the drilled well;
   defining layering of the earth formation using the computer;
   determining a geological model for each horizontal layer using the computer;
   modeling pressure transient in each measurement region by representing pressure transient within a horizontal layer using an analytical solution and representing pressure transient between two horizontal layers using a numerical solution, the analytical solution selected based on at least one of the respective geological model and data regarding a drilled well of the reservoir, and a parameter of the analytical solution and a parameter of the numerical solution being determined based on the formation testing data of one of the two immediately adjacent measurement stations using the computer; and
   determining the permeability of the earth formation based on the pressure transient model using the computer.

2. The method of claim 1, wherein the pressure transient modeling with respect to a first measurement region comprises:
   initially modeling the pressure transient in the first measurement region using the computer;
   using the initial pressure transient model to determine a first initial permeability of the earth formation within an overlapping layer covered by the first measurement region and a second immediately adjacent measurement region using the computer;
   comparing the first initial permeability to a second initial permeability of the overlapping layer determined with respect to the second measurement region using the computer; and
   adjusting the initial pressure transient model of the first measurement region when the first initial permeability and the second initial permeability deviate to a preset extent using a computer.

3. The method of claim 2, wherein the second measurement region is next to the first measurement region in a direction of toolstring movement.

4. The method of claim 1, further comprising at least one of:
   interpreting packer pressure data to estimate a property of a layer where a packer is positioned;
   defining a probable permeability value of the earth formation based on pretest data; and
   determining the parameter based on at least one of the estimated property and the defined probable permeability.

5. The method of claim 1, wherein the geological model includes a combination of one of an isotropic formation or an anisotropic formation and one of a homogeneous formation or a heterogeneous formation, and the drilled well data includes a type of the drilled well.

6. A system for determining permeability of an earth formation of a reservoir, the system comprising:
   at least one computing device configured to perform the following steps:
   receiving formation testing data measured at multiple measurement stations along the drilled well, a measurement region of each measurement station covering multiple horizontal layers and measurement regions of two immediately adjacent measurement stations overlapping at least one horizontal layer, said multiple measurement stations including a dual-packer module or a dual-probe module and at least one observation probe positioned separately along with the drilled well;
   defining layering of the earth formation;
   determining a geological model for each horizontal layer;
   modeling pressure transient in each measurement region by representing pressure transient within a horizontal layer using an analytical solution and representing pressure transient between two horizontal layers using a numerical solution, the analytical solution selected based on at least one of the respective geological model and data regarding a drilled well of the reservoir, and a parameter of the analytical solution and a parameter of the numerical solution being determined based on the formation testing data of one of the two immediately adjacent measurement stations; and
   determining the permeability of the earth formation based on the pressure transient model.

7. The system of claim 6, wherein the operation with respect to a first measurement region includes:
   the pressure transient modeling initially modeling the pressure transient in the first measurement region;
   the permeability determining using the initial pressure transient model to determine a first initial permeability of the earth formation within an overlapping layer covered by the first measurement region and a second immediately adjacent measurement region;

comparing the first initial permeability to a second initial permeability of the overlapping layer determined with respect to the second measurement region; and adjusting the initial pressure transient model of the first measurement region when the first initial permeability and the second initial permeability deviate to a preset extent.

8. The system of claim 7, wherein the second measurement region is next to the first measurement region in a direction of toolstring movement.

9. The system of claim 6, further comprising at least one of:
interpreting packer pressure data to estimate a property of a layer where a packer is positioned; and
defining a probable permeability value of the earth formation based on pretest data;
wherein the pressure transient modeling determines the parameter based on at least one of the estimated property and the defined probable permeability.

10. The system of claim 6, wherein the geological model includes a combination of one of an isotropic formation or an anisotropic formation and one of a homogeneous formation or a heterogeneous formation, and the drilled well data includes a type of the drilled well.

11. A non-transitory computer readable medium containing instructions for determining permeability of an earth formation of a reservoir stored therein for causing a computer processor to:
receive formation testing data measured at multiple measurement stations along the drilled well, a measurement region of each measurement station covering multiple horizontal layers and measurement regions of two immediately adjacent measurement stations overlapping at least one horizontal layer, said multiple measurement stations including a dual-packer module or a dual-probe module and at least one observation probe positioned separately along with the drilled well;
define layering of the earth formation;
determine a geological model for each horizontal layer;
model pressure transient in each measurement region by representing pressure transient within a horizontal layer using an analytical solution and representing pressure transient between two horizontal layers using a numerical solution, the analytical solution selected based on at least one of the respective geological model and data regarding a drilled well of the reservoir, and a parameter of the analytical solution and a parameter of the numerical solution being determined based on the formation testing data of one of the two immediately adjacent measurement stations; and
determine the permeability of the earth formation based on the pressure transient model.

12. The non-transitory computer readable medium containing instructions for determining permeability of an earth formation of a reservoir of claim 11, wherein with respect to a first measurement region, a program code is configured to enable the computer processor to:
initially model the pressure transient in the first measurement region;
use the initial pressure transient model to determine a first initial permeability of the earth formation within an overlapping layer covered by the first measurement region and a second immediately adjacent measurement region;
compare the first initial permeability to a second initial permeability of the overlapping layer determined with respect to the second measurement region; and
adjust the initial pressure transient model of the first measurement region when the first initial permeability and the second initial permeability deviate to a preset extent.

13. The non-transitory computer readable medium containing instructions for determining permeability of an earth formation of a reservoir of claim 12, wherein the second measurement region is next to the first measurement region in a direction of toolstring movement.

14. The non-transitory computer readable medium containing instructions for determining permeability of an earth formation of a reservoir of claim 11, wherein the program code is further configured to enable the computer processor to:
interpret packer pressure data to estimate a property of a layer where a packer is positioned;
define a probable permeability value of the earth formation based on pretest data; and
determine the parameter based on at least one of the estimated property and the defined probable permeability.

15. The non-transitory computer readable medium containing instructions for determining permeability of an earth formation of a reservoir of claim 11, wherein the geological model includes a combination of one of an isotropic formation or an anisotropic formation and one of a homogeneous formation or a heterogeneous formation, and the drilled well data includes a type of the drilled well.

* * * * *